March 10, 1959 — M. L. STANLEY — 2,876,517
FASTENING DEVICES
Filed Sept. 26, 1955
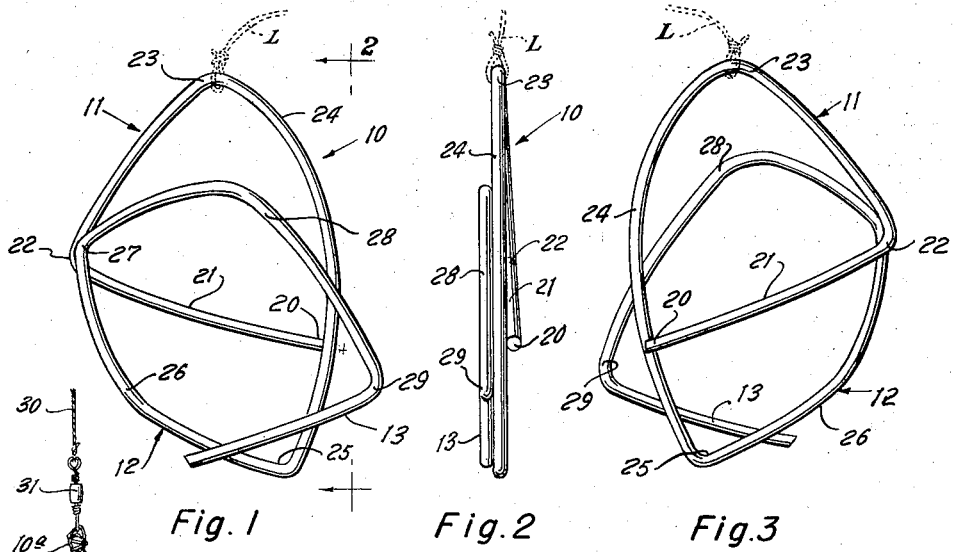
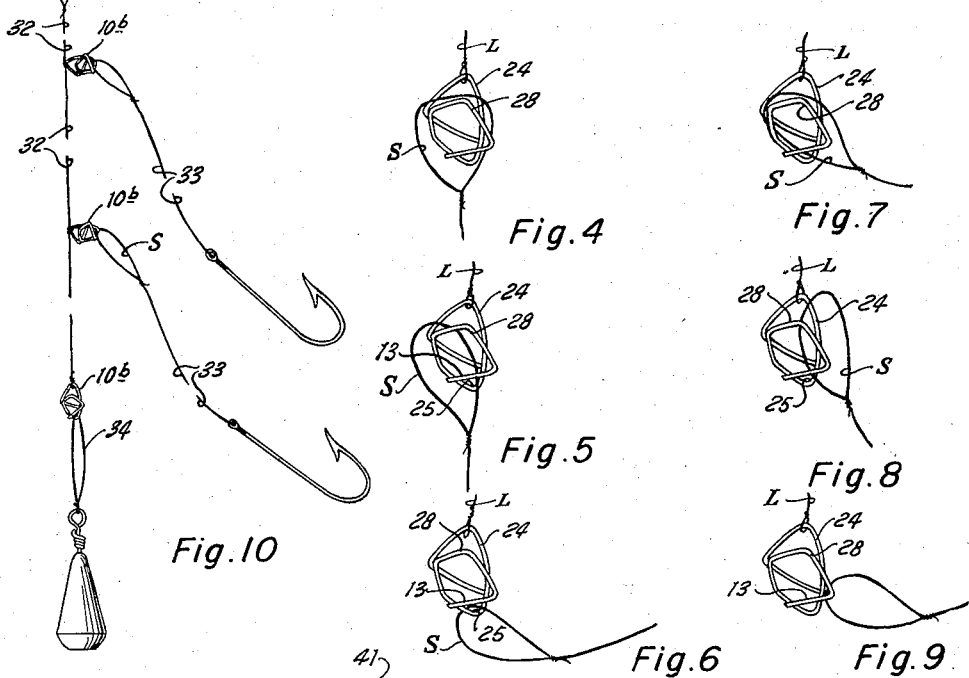
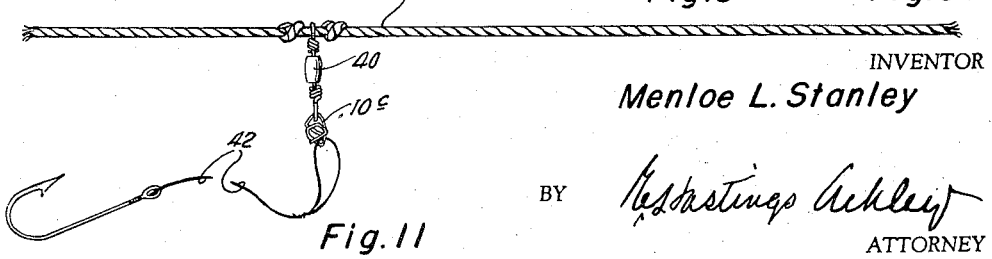
INVENTOR
Menloe L. Stanley
BY
ATTORNEY

United States Patent Office 2,876,517
Patented Mar. 10, 1959

2,876,517

FASTENING DEVICES

Menloe L. Stanley, Dallas, Tex.

Application September 26, 1955, Serial No. 536,461

7 Claims. (Cl. 24—131)

This invention relates to new and useful improvements in fastening devices.

The need of improved means for fastening two or more members together in a manner which will facilitate both the engagement and the disengagement of one of said members from one or more of the others has been felt in many fields. A particular field in which the need of a fastener that will permit quick, easy and sure connection of one or more members with another is in the sport of fishing, where the need for attaching snelled hooks to fishing lines, or for joining transparent gut or plastic leaders to fishing lines and to hooks and the like, without the need of knots or snap type fasteners, is urgently felt.

It is, therefore, one object of this invention to provide improved means for releasably fastening a flexible line to a looped portion of another flexible line in such a manner as to provide a positive connection between the lines.

Another object of the invention is to provide means for quickly and easily connecting and disconnecting two or more lines or flexible members, which means lends itself to manipulation by the sense of feel alone.

A particular object of the invention is to provide new and improved fastener means adapted for use in releasably connecting flexible lines one to another by the simple expedient of slipping a loop of one line into an eye-loop of the fastener, which fastener is secured to the other line, the loop of the line being positively retained in the eye-loop of the fastener by a restraining bar formed on the fastener means; and wherein the line-loop may be as easily and quickly slipped out of the eye-loop.

A further object of the invention is to provide means for quickly, easily, simply and safely attaching and removing the leaders of fish hooks, or lures or the like, to and from a fishing line without the use of knots or snap or catch fasteners which are slow and difficult to manipulate.

Additional objects and advantages of the invention will be readily apparent from the reading of the following description of a device constructed in accordance with the invention, and reference to the accompanying drawings thereof, wherein:

Figure 1 is a view in elevation of one side of a fastener constructed in accordance with the invention, Figure 2 is a side view of the device of Figure 1, Figure 3 is a view in elevation of the opposite side of the fastener, Figures 4 through 6 are views in elevation of a fastener illustrating the manner in which the looped end of the line may be attached to the eye of the fastener.

Figures 7 through 9 are views, similar to Figures 4 through 6, showing the manner in which the looped end of the line is disengaged from the eye of the fastener, and Figures 10 and 11 illustrate the fastener being used as connecting means between lines and leaders carrying fish hooks, weights and the like.

In the drawings, the numeral 10 designates generally a fastener constructed in accordance with the invention and comprising a single length of suitable spring wire bent upon itself in substantially helical convolutions to form two offset but overlapping loops, an upper or line-loop 11 and a lower or eye-loop 12, the end portion of the wire being bent back across the lower bight portion of the lower or eye-loop to provide a line restraining or retaining bar 13 across said eye-loop.

In fashioning the fastener, an elongate resilient metal wire is first wound from one free end 20 of said wire to form a substantially triangular upper or line-loop 11 having an elongate transverse length or base 21 from which the wire is bent at an angle 22 upwardly to a line receiving arc or apex 23 where it is curved back downwardly in an elongate arcuate side or leg 24 past the free end 20 to a point spaced substantially below the transverse section 21. The wire is then bent back upwardly in an arcuate or angular leg 26 toward the angle 22, forming a line-receiving arcuate angle or bight opening 25 at the extreme lower end of the fastener. The angular leg 26 extends upwardly to a point adjacent and overlying the angle 22, where the wire is again bent or curved inwardly at an angle 27 to extend in a humped or nose length 28 across the lower portion of the upper line-receiving loop 11 and across the elongate arcuate leg 24 at a point spaced above the free end 20 of the wire. The humped or nose length 28 extends outwardly beyond the leg 24 and is bent at an angle 29 back inwardly to form the restraining or retaining bar 13 which extends across the lower portion of the eye-loop 12, contacting the arcuate leg 24 and the angular leg 26 adjacent the angle forming the bight opening 25 and closing said opening. The wire is cut off beyond but adjacent the angular leg 26. Thus, the wire is bent into substantially a helical form of substantially two turns forming two loops, one offset from the other, so that the upper portion of the line loop 11 is open for the attachment of the fastener to a suitable line L, shown in dotted lines in Figures 1 through 3, or to any other suitable member by which the fastener is to be carried; and the bight opening 25 of the lower or eye-loop 12, to which a second line is to be connected, is disposed below the line-loop. Since the wire forming the loops resiliently bear against the adjacent sections of wire as it crosses the same, the looped portions of the fastener may be resiliently spread apart to facilitate entry of a second flexible line or the like therebetween into the bight opening 25, and will spring back into engaging and retaining contact with the adjacent legth of wire to retain such line in place therein.

In use, after the fastener has been connected to a suitable fishing line L or the like, the loop end S of a snelled leader from a fishhook or the like is engaged in the bight opening 25 in the manner shown in Figures 4 through 6. The loop is positioned in engagement with the upper portion of the line-loop 11 and above the humped or nose length 28 of the lower eye-loop 12, as clearly shown in Figure 4. A downward force applied to the leader will then pull the loop downwardly between the leg 24 and the nose 28, in the manner shown in Figure 5, until the loop enters the bight opening 25 at the lower end of the eye-loop 12 below the retaining bar 13. The resiliency of the metal wire of which the fastener is made permits the loop to readily slide between the contacting portions into the bight opening, whereupon the wires again are biased into engagement with each other to retain the loop in the bight opening. The retaining bar 13 is particularly fashioned to lie in close contact with the lower portion of the eye-loop 12 and adjacent the angle defining the bight openings to provide means for positively restraining or retaining the loop S of the leader in such bight opening of the eye-loop. Furthermore, the position of the bar 13 may be so close to the angle forming the bight opening that any looped flexible member engaged in the opening will be gripped between the portion of the wire defining the opening and the retaining bar, and will thus be still more positively held from displacement therefrom.

To remove the leader loop S from the fastener the procedure is reversed, as shown in Figures 7 through 9. The loop S in the leader is again looped over the humped or nose length 28 in engagement with the legs 24 and 26 of the line-loop, as shown in Figure 7, and is then pulled downwardly therebetween, as shown in Figure 8, springing the wire loops apart and passing freely out of the bight opening, as shown in Figure 9.

It will be noted that when the leader loop S is connected to the fastener as shown in Figure 6, it is engaged in the bight opening 25 at a point opposite the apex angle 23 of the upper loop 11 at which the line L is connected. Any force applied to either of the members will only tend to retain them in engagement in their respective loops, the line L in the line-loop 11 and the leader loop S in the bight opening 25 of the eye-loop 12.

The two loops are so fashioned that the fastener has a length between the bight opening 25 and the angle 23 in the line-loop 11 which is greater than the width of the fastener, so that any pulling force applied to the line and to the leader or other member connected in the bight opening will always retain the fastener in position with its greater dimension lying along the line of force applied to the lines connected thereto. Furthermore, this construction facilitates the engagement and disengagement of the looped leader or other device in the fastener, since the eye-loop 12 is disposed below the angle 23 of the line-loop 11 to which the line L is connected. It will readily be seen that the user may grasp the fastener in such a manner that his finger rests against one side of the fastener, principally engaging the line-loop 11, and his thumb engages the opposite side of the fastener, principally engaging the eye-loop 12. Thus, any flexible loop member S disposed between the finger and thumb of the user and positioned above the humped or nose length 28 of the fastener will be readily guided between the nose length 28 of the eye-loop and the leg 24 of the line-loop, and will slide quickly and easily downwardly into the bight opening 26 of the eye-loop 12 in the manner already described. Similarly, in disengaging the flexible loop member S, the fastener is grasped in the same manner as before and the loops of the flexible member is disposed between the finger and thumb and above the upper arcuate nose length 28 of the eye-loop, whereupon it is again guided downwardly between the nose length and the leg 24 of the fastener and will slide outwardly therebetween in the manner shown in Figures 7 through 8. This construction and design so facilitates the manipulation of the fastener and the flexible loop members being connected by means of the fastener that the entire operation may be carried out by feel alone very quickly without the necessity of tying knots or engaging a snap or catch fastener.

As clearly shown in Figures 10 and 11, the fastener may be incorporated in a great number of various types of fishing equipment. In Figure 10, the line 30 carries a swivel 31 having a fastener 10a connected thereto and an elongate gut hook leader 32 engaged in the lower end of the fastener 10a, a plurality of other fasteners 10b are connected at various point to the leader 32 and the loops of flexible leaders 33 carrying fishhooks or the like may be connected to the fasteners 10b, or a loop 34 carrying a weight may be connected to one of the fasteners. Also, as is shown in Figure 11, the fastener 10c may be connected to one end of a swivel 40 which has its opposite end connected to a fish line 41, which may be in the form of a trot-line or the like, having a plurality of swivels and fasteners mounted thereon. A flexible leader 42 carrying a fishhook may be connected to the fastener 10c to connect the hook to the fishline 41.

From the foregoing it will be seen that an improved fastener has been provided for fastening a flexible line an another member in such a manner as to provide a positive connection between the members; that the fastener is so designed that it lends itself readily to manipulation by the sense of feel alone, that the fastener has retaining means provided thereon for positively restraining or retaining the flexible looped line in connected position in the fastener; and from which the line may be easily and quickly disconnected upon proper manipulation. It will also be seen that the fastener provides a means for readily, quickly, simply and safely attaching and disconnecting fish lines or the like to or from other lines.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A fastener including: an elongate length of resilient wire bent to form a closed loop, said wire being further bent downwardly below said first closed loop, then back upwardly toward said closed loop to overlie a portion thereof, said length of resilient wire being then bent downwardly toward the portion below said first closed loop to form a second closed loop overlapping but off-set from said first closed loop; said wire being bent across the lower portion of said lower closed loop to provide a closed line receiving opening in such lower portion of said lower closed loop; said portion of the wire closing said line opening resiliently engaging said lower closed loop to provide a line restraining member for holding a line in said opening.

2. A fastener including: an elongate length of resilient wire bent to form a closed loop, said wire being further bent downwardly below said first closed loop, then back upwardly toward said first loop to provide a bight opening below said first closed loop, said resilient wire extending upwardly to overlie a portion of said first closed loop, said length of resilient wire being then bent downwardly toward the portion below said first closed loop to form a second closed loop overlapping but off-set from said first closed loop; said wire being then bent to provide a restraining member extending across the bight opening of said lower loop to close the bight opening, said restraining member being resiliently held in contacting engagement with the wire defining said bight opening.

3. A fastener of the character set forth in claim 1, wherein the overlapping portions of the two loops may be spread apart to permit a member to pass therebetween and will resiliently return to overlapping contacting engagement after said member has passed therebetween.

4. A fastener of the character set forth in claim 2, wherein the overlapping portions of the two loops may be spread apart to permit a member to pass therebetween and will resiliently return to overlapping contacting engagement after said member has passed therebetween.

5. A fastener of the character set forth in claim 2, wherein the upper closed loop has a substantially triangular configuration with its apex disposed at a point remote from the bight opening of the lower loop, whereby a line may be attached at said apex and a second line attached in said bight opening and said lines will be retained in substantially such positions.

6. A fastener including: a transverse section having a lower free end and extending angularly upwardly in one direction from said free end to an upper end; a first leg section extending angularly upwardly from said upper end of said transverse section to an upper end; a second leg section extending arcuately downwardly from the upper end of said first leg section and past said lower free end on one side of said transverse section to a lower end, said second leg section having an adjacent side engaging said one side of said transverse section adjacent said lower free end thereof; a third leg section extending angularly upwardly from said lower end of said second leg section past said transverse section to an upper end and having a first side engaging said transverse section adjacent the end opposite to said lower free end thereof and on said one side thereof; a fourth leg section extending arcuately first upwardly and then downwardly and past said second leg section to a lower end, said fourth leg section having a side engaging a side of said second leg section opposite to said adjacent side thereof; and a restraining section extending downwardly from the lower end of said fourth leg section and past the said second leg section and said third leg section above the lower ends thereof, said restraining section having a side engaging a side of said second leg section opposite to said adjacent side thereof and engaging a side of said third leg section opposite to said first side thereof.

7. A fastener including: a transverse section having a lower free end and extending angularly upwardly in one direction from said free end to an upper end; a first leg section extending angularly upwardly from said upper end of said transverse section to an upper end; a second leg section extending arcuately downwardly from the upper end of said first leg section and past said lower free end on one side of said transverse section to a lower end, said second leg section having an adjacent side engaging said one side of said transverse section adjacent said lower free end; a third leg section extending angularly upwardly from said lower end of said second leg section past said transverse section to an upper end and having a first side engaging said transverse section adjacent the end opposite to said lower free end thereof and on said one side thereof; a fourth leg section extending arcuately first upwardly and then downwardly and past said second leg section to a lower end, said fourth leg section having a side engaging a side of said second leg section opposite to said adjacent side thereof; and a restraining section extending downwardly from the lower end of said fourth leg section and past the said second leg section and said third leg section above the lower ends thereof, said restraining section having a side engaging a side of said second leg section opposite to said adjacent side thereof and engaging a side of said third leg section opposite to said first side thereof; said engaging sides of said sections being resiliently biased toward each other.

References Cited in the file of this patent

UNITED STATES PATENTS

| | | |
|---|---|---|
| 220,319 | Wakeley | Oct. 7, 1879 |
| 1,226,891 | Jay | May 22, 1917 |
| 1,873,607 | Lefevre | Aug. 23, 1932 |